Dec. 29, 1925.  
R. H. WEBBER  
1,567,350  
CYLINDER GRINDING MACHINE  
Filed Jan. 23, 1922  
2 Sheets-Sheet 1

Inventor.  
Roy Harrison Webber  
by H. J. S. Dennison  
atty.

Dec. 29, 1925.  R. H. WEBBER  1,567,350
CYLINDER GRINDING MACHINE
Filed Jan. 23, 1922   2 Sheets-Sheet 2
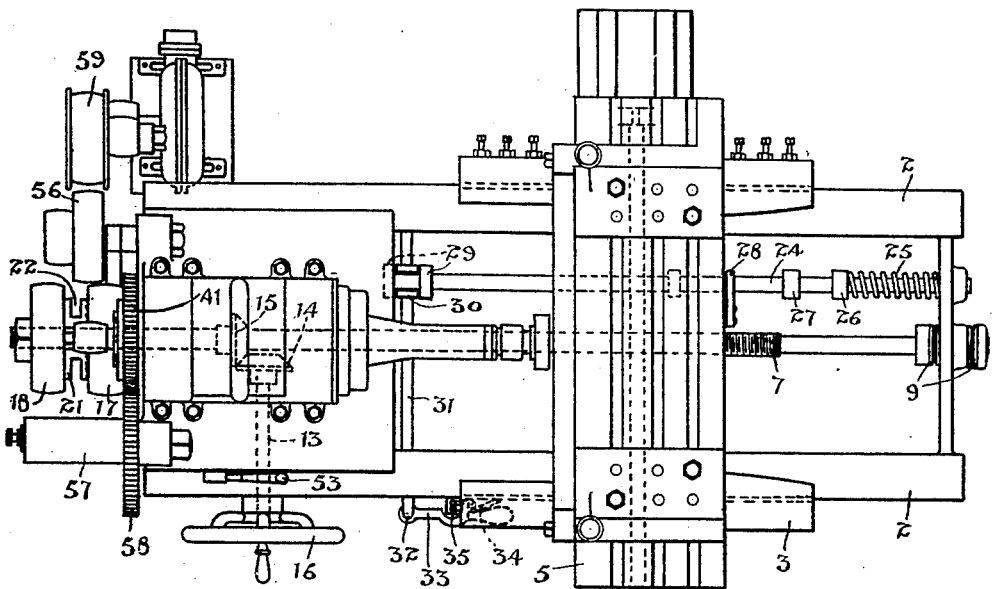
Fig. 2.
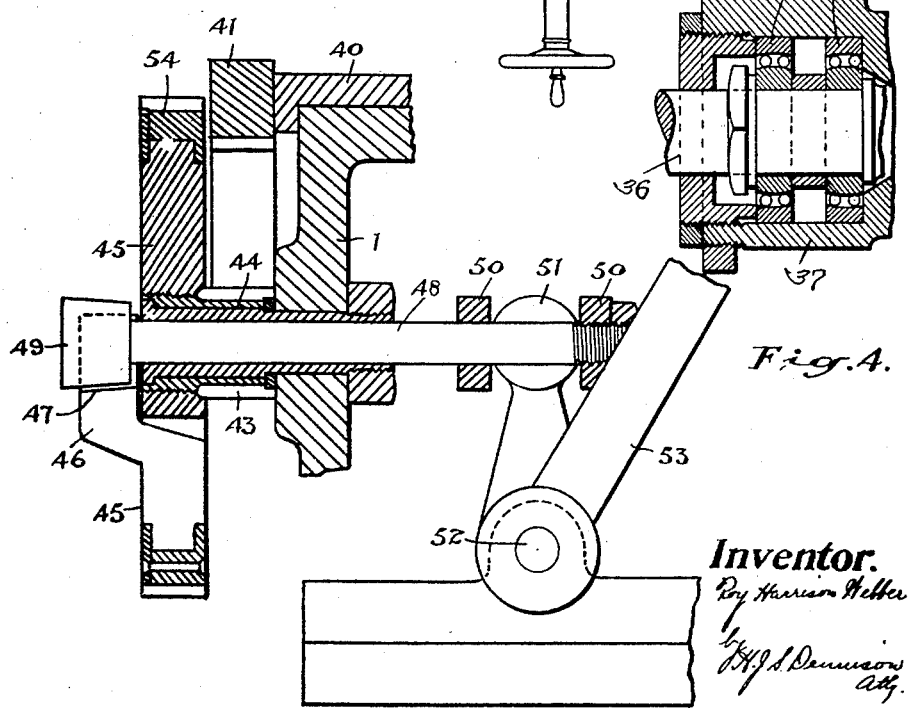
Fig. 5.
Fig. 4.
Inventor.
Roy Harrison Webber
by H. J. S. Dennison
Atty.

Patented Dec. 29, 1925.

1,567,350

UNITED STATES PATENT OFFICE.

ROY HARRISON WEBBER, OF TORONTO, ONTARIO, CANADA.

CYLINDER-GRINDING MACHINE.

Application filed January 23, 1922. Serial No. 531,192.

*To all whom it may concern:*

Be it known that I, ROY HARRISON WEBBER, a subject of the King of Great Britain, and resident of the city of Toronto, county of York, Province of Ontario, in the Dominion of Canada, have invented certain new and useful Improvements in a Cylinder-Grinding Machine, described in the following specification and illustrated in the accompanying drawings, that form part of the same.

The principal objects of the invention are, to facilitate the operation of grinding cylinders, rendering such operation less expensive and more accurate than the present methods, and to devise a machine of very positive action and of simple and durable construction.

The principal features of the invention consist in the novel construction and arrangement of parts, whereby the movement of the work supporting carriage is controlled and automatically reversed, and whereby the gyratory action of the grinder is controlled by a special clutch mechanism.

In the drawings, Figure 1 is a side elevational and part sectional view of my improved grinder.

Figure 2 is a plan view.

Figure 4 is an enlarged vertical sectional view through the grinder clutch taken on the line 4—4 of Figure 3.

Figure 5 is an enlarged sectional detail view showing the ball bearings for the head end of the grinder spindle.

Figure 1:
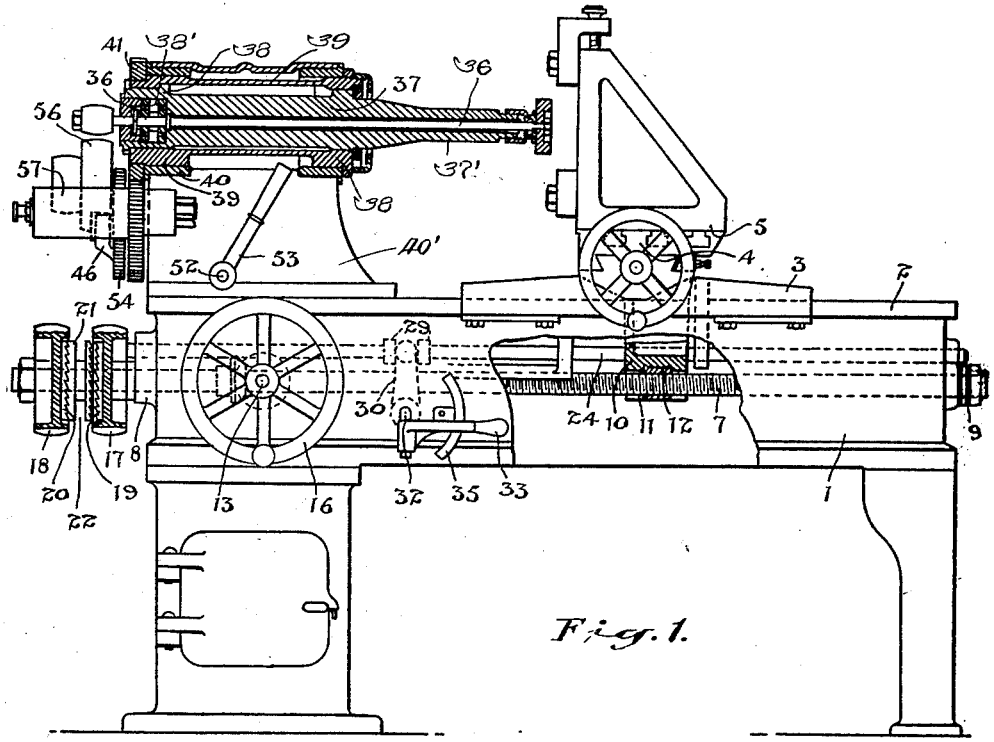
Figure 3:
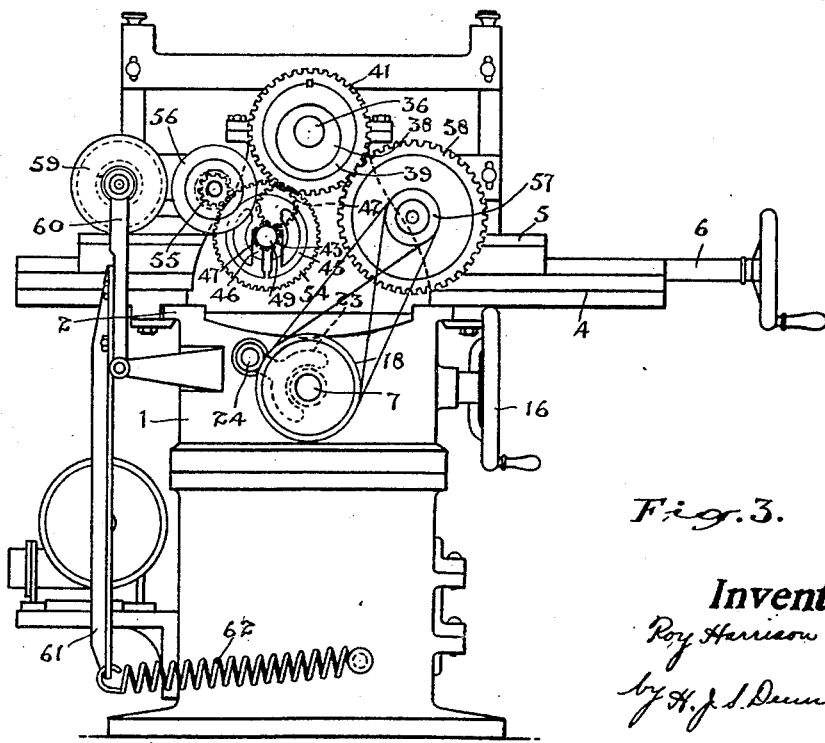
Figure 3 is an end elevational view.

In the construction herein shown the bed 1 is provided with the usual parallel side guides 2 on which is mounted the carriage 3 having the transverse guide 4 on which is mounted the carriage 5, said carriage being operated by means of a feed screw 6.

The main feed screw 7 is centrally arranged between the guides and extends from end to end of the machine being supported in a sleeve bearing 8 at the forward end and having a double ball thrust bearing 9 at the other end.

The longitudinally slidable carriage formed by the slides 3 is provided with a central extension 10, the lower end of which is provided with a longitudinal channel 11 open at the bottom through which the main feed screw 7 extends.

A bronze feed nut 12 threaded on the feed screw 7 is loosely but non-rotatively held in the channel 11 so that there will be no tendency to bind between the carriage and the feed screw.

Adjacent to the forward end of the machine a shaft 13 is transversely journalled and upon the inner end of this shaft is mounted a bevelled pinion 14 meshing with the bevelled pinion 15 secured to the feed screw. On the outer end of said shaft is mounted a hand wheel 16 for hand operating the feed screw.

Loosely mounted upon the forward end of the feed screw are a pair of pulleys 17 and 18 which are driven in opposite directions and on the adjacent faces of said pulleys are arranged the toothed clutch faces 19 and 20.

Between the clutch faces and splined upon the shaft is a clutch sleeve 21 having double faces to correspond with the adjacent clutch faces. The distance between the pulley faces is sufficient to allow the clutch sleeve to be moved into a neutral position out of contact with both of the pulleys. The clutch sleeve is provided with an annular groove 22 which is engaged by a forked arm 23 secured to the end of a rod 24 slidably arranged in the frame.

A coil compression spring 25 encircles the rod 24 at the back end of the machine and is adapted to be engaged by a collar 26 secured to the rod.

Stop collars 27 are adustably secured to the rod 24 adapted to be engaged by an arm 28 on the main carriage which moves the rod to operate the clutch sleeve and change the direction of rotation of the feed screw.

It is sometimes desirable to operate the carriage by hand and in order to accomplish this a pair of collars 29 are secured to the rod 24. These are engaged by a yoke-shaped arm 30 secured to a cross shaft 31. This shaft projects beyond the face of the bed 1 and is provided with a crank end 32 and upon this crank end is rotatably secured a handle 33. This handle is provided with a latch 34 engaging a quadrant member 35 secured to the bed 1.

The handle 33 is operated to shift the clutch sleeve 21 to either the forward or reverse position as may be desired or it may be secured to hold the rod in the neutral position.

The grinder spindle 36 is supported in a sleeve member 37 which is formed with a rigid tapering end 37' carrying a journal bushing which supports the spindle close up to the grinder wheel secured thereon. At the head end of the machine the spindle is supported in a double ball bearing 38' which is suitably designed to absorb end thrust. The spindle is held perfectly true and being supported from the grinder wheel will be free from vibration, further, the spindle is free to expand and contract under changing temperature conditions without binding.

The sleeve 37 is of eccentric formation having the eccentric portions 38 rotatably mounted in the sleeve 39, which sleeve is concentrically journalled in the bearings 40 which are rigidly supported on the head 40'. This eccentric sleeve support is provided so that by turning the sleeve 37 in the sleeve 39 the axis of the grinder spindle may be set to any desirable position off centre from the axis of rotation of the sleeve 39 and upon rotation of the sleeve 39 the grinder wheel will operate with a gyratory movement having an orbit adjustable to suit the diameter of cylinder to be ground.

The sleeve 39 has secured to its head end a spur gear ring 41 which meshes with the pinion 42 journalled on a stud secured to the head 40'. The pinion 42 meshes with the pinion 43 journalled on the sleeve 44 which is secured in the head 40' preferably below and slightly to one side of the axis of the grinder sleeve.

The pinion 43 is formed with a threaded projection upon which is threaded the hub of the expansible sheave 45.

The sheave 45 is in the form of a flexible split band carried by the threaded hub and the ends thereof are provided with outwardly offset arms 46 which extend parallelly toward the axis of the sheave and the ends thereof are formed with tapering faces 47 arranged with their conjoint axes in alignment with the axis of the sheave.

A rod 48 extends through the sleeve 44 and on the outer end is secured the frustum of a cone 49 which is adapted to engage the concaved faces 47 to expand the sheave. A gear ring 54 is loosely mounted on the perimeter of the sheave 45 and meshes with the pinion 55 mounted on the head 40' and driven by the pulley 56.

The rod 48 is provided with a pair of flanged stops 50 which are engaged by a forked arm 51 on a transverse rod 52 operated by a lever 53 at the outside of the frame.

By manipulating the lever 53 the cone 49 is moved into or out of contact with the arms 46 of the sheave and when moved into contact and pressed into place the cone spreads the arms apart so as to lock the sheave with the gear ring 54 which thus rotates the eccentric sleeve support of the grinder spindle. A very efficient clutch is thus produced.

The main feed screw pulleys are operated by suitable belts driven by a pulley 57 mounted on a stud rigidly supported from the grinder head and a spur gear 58 is secured to said pulley and meshes with the spur gear 41. The longitudinal feed is thus directly connected with the means for operating the grinder spindle in its orbit and consequently when the sleeve is thrown out of gear the feed is stopped.

In the operation of this machine, the work is secured to the face plate on the carriage 5 which is adjusted transversely by means of the hand screw 6. The eccentric sleeve of the grinder spindle is then adjusted to give the proper gyration for the size of the cylinder to be ground and the handle 33 is moved to throw the clutch sleeve 21 into gear with the pulley 17 to move the carriage forwardly on the guides 2 when the operation is commenced.

When the carriage reaches the limit of its forward movement the stop arm 28 engages the forward stop collar on the rod 24 and pushing upon the rod it releases the clutch sleeve from the pulley 17 and the spring 25 carries the rod 24 to move the clutch sleeve outwardly until it engages the clutch face of the pulley 18 and as the said pulley 18 operates in the reverse direction to the pulley 17 the direction of rotation of the feed screw will be reversed. This carries the carriage backwardly until the stop arm 28 engages the collar on the rod 24 pulling upon said rod to first compress the spring 25 and then release the clutch sleeve from the pulley 18 and throw it out of engagement with the clutch pulley 18 and the machine then rests until the eccentric sleeve adjustment is altered for a further cut.

The quadrant member 35 is formed with a double groove on its periphery, one of which receives the latch 34 and allows the handle 33 to swing freely as the rod 24 is moved backward and forward but the other groove is formed with a suitable stop adapted to engage the latch to hold it in such a position as to retain the clutch sleeve 21 in a neutral position midway between the two pulleys when the carriage may be operated by means of the hand wheel 16.

The belt for driving the machine is maintained at a uniform tension by a pulley 59 carried on a pivotal arm 60 having an extension 61 to the end of which is connected a spiral tension spring 62 secured to the frame.

What I claim as my invention is:

1. A grinding machine, comprising, a bed, a carriage movable longitudinally on said bed, a sleeve rotatable in the head end of the machine, a grinder spindle eccentrically mounted in said sleeve, a spur gear mounted on said sleeve, a spur gear ring meshing with said spur gear, an expansible sheave arranged within said spur gear ring and adapted to grip said ring, means for rotating said sheave, and means for moving said carriage longitudinally.

2. A grinding machine, comprising, a bed, a carriage moveable longitudinally on said bed, a sleeve rotatable in the head end of the machine, a grinder spindle eccentrically mounted in said sleeve, a spur gear mounted on said sleeve, a spur gear ring meshing with said spur gear, a sheave rotatable within said gear ring and having a split perimeter, axially disposed tapered portions connected individually with the divided portions of the sheave, a spindle extending axially through the sheave, a tapered member secured to said spindle and adapted to be moved into expanding contact with said tapered portions to expand the sheave into locking engagement with the gear ring, means for moving the spindle longitudinally, and means for moving said carriage longitudinally.

3. A grinding machine, comprising, a bed, a carriage movable longitudinally on said bed, a sleeve rotatable in the head end of the machine, a grinder spindle eccentrically mounted in said sleeve, a spur gear mounted on said sleeve, a spur gear ring meshing with said spur gear, a sheave rotatable within said gear ring and having a split perimeter, axially disposed tapered portions connected individually with the divided portions of the sheave, a spindle extending axially through the sheave, a tapered member secured to said spindle and adapted to be moved into expanding contact with said tapered portions to expand the sheave into locking engagement with the gear ring, a transverse shaft journalled in the grinder head having a handle on the outer end and a forked lever on the inner end, a pair of collars on said spindle engaging said forked lever, and means for moving said carriage longitudinally.

4. In a grinding machine, the combination with the bed and carriage slidable thereon, of a sleeve rotatably mounted in the head of the grinding machine, a spindle sleeve eccentrically mounted in said rotatable sleeve, a spindle eccentrically journalled in said spindle sleeve, means for rotating said spindle, means for rotating the outer sleeve to move said spindle with a gyratory movement, a clutch interposed in said sleeve driving means, a feed screw for operating the carriage, and means for driving the feed screw controlled by said clutch.

5. In a grinding machine, a base, a carriage longitudinally moveable on said base, a feed screw, a head secured at one end of said base, a sleeve rotatably mounted in said head, a spindle eccentrically journalled in said sleeve, a spur gear secured to said sleeve, an idler pinion meshing with said gear, a pinion meshing with the aforesaid pinion, an expansible sheave carried by the latter pinion, a gear ring carried by said sheave, a pinion meshing with said sheave gear ring, a pulley operating said pinion, a spur gear meshing with the sleeve gear and supported on the head, a pulley carried by said spur gear, a pair of pulleys loosely mounted on the feed screw and operatively connected with the latter spur gear, and a slidable clutch member keyed to the feed screw and adapted to engage either of said pulleys in rotative contact.

ROY HARRISON WEBBER.